United States Patent
Miura et al.

(10) Patent No.: US 12,331,137 B2
(45) Date of Patent: Jun. 17, 2025

(54) METHOD FOR PRODUCING PURIFIED CHLOROPRENE-BASED-POLYMER LATEX

(71) Applicant: SHOWA DENKO K.K., Tokyo (JP)

(72) Inventors: Yuki Miura, Yokohama (JP); Keiichi Nakamura, Kawasaki (JP)

(73) Assignee: Resonac Corporation, Tokyo (JP)

(*) Notice: Subject to any disclaimer, the term of this patent is extended or adjusted under 35 U.S.C. 154(b) by 783 days.

(21) Appl. No.: 17/613,740

(22) PCT Filed: May 13, 2020

(86) PCT No.: PCT/JP2020/019043
§ 371 (c)(1),
(2) Date: Nov. 23, 2021

(87) PCT Pub. No.: WO2020/241252
PCT Pub. Date: Dec. 3, 2020

(65) Prior Publication Data
US 2022/0235151 A1    Jul. 28, 2022

(30) Foreign Application Priority Data

May 31, 2019  (JP) .................................. 2019-103112

(51) Int. Cl.
*C08C 1/04*    (2006.01)
*C08C 1/075*   (2006.01)
(Continued)

(52) U.S. Cl.
CPC ................ *C08C 1/04* (2013.01); *C08L 11/02* (2013.01)

(58) Field of Classification Search
None
See application file for complete search history.

(56) References Cited

U.S. PATENT DOCUMENTS

| | | | |
|---|---|---|---|
| 4,032,497 A * | 6/1977 | Kidoh | C08C 1/04 524/835 |
| 4,283,526 A | 8/1981 | Chandra et al. | |
| 6,034,209 A * | 3/2000 | Takeyama | B01D 1/16 528/502 R |

FOREIGN PATENT DOCUMENTS

| JP | 51-11878 A | 1/1976 |
|---|---|---|
| JP | 51-37175 A | 3/1976 |

(Continued)

OTHER PUBLICATIONS

"Phase Change Substance Property Tables", provided by the Michigan State University Department of Mechanical Engineering. (Year: 2012).*

(Continued)

*Primary Examiner* — Michael J Feely
(74) *Attorney, Agent, or Firm* — Sughrue Mion, PLLC

(57) ABSTRACT

Provided is a method for producing purified chloroprene-based-polymer latex which enables efficiently removing a residual volatile organic substance from chloroprene-based-polymer latex while suppressing foaming and the deposition of aggregates. The method for producing purified chloroprene-based-polymer latex of the present invention has at least the following steps (I) to (III):

Step (I): a step of introducing chloroprene-based-polymer latex into a container beforehand, Step (II): a step of removing a residual volatile organic substance in the chloroprene-based-polymer latex which satisfies specific requirements (1) to (4), and Step (III): a step of collecting the latex from the container after performing the step (II) at least once, to thereby obtain purified chloroprene-based-polymer latex.

15 Claims, 7 Drawing Sheets

(51) Int. Cl.
*C08C 1/12* (2006.01)
*C08L 11/02* (2006.01)

(56) References Cited

FOREIGN PATENT DOCUMENTS

| | | | |
|---|---:|---|---:|
| JP | 56-41212 | A | 4/1981 |
| JP | 05-255424 | A | 10/1993 |
| JP | 8-325321 | A | 12/1996 |
| JP | 2000-264915 | A | 9/2000 |
| JP | 2005-105008 | A | 4/2005 |
| JP | 2010-537011 | A | 12/2010 |
| JP | 2012-524132 | A | 10/2012 |
| WO | 2011/065524 | A1 | 6/2011 |

OTHER PUBLICATIONS

International Search Report of PCT/JP2020/019043 dated Aug. 11, 2020 [PCT/ISA/210].

* cited by examiner

METHOD FOR PRODUCING PURIFIED CHLOROPRENE-BASED-POLYMER LATEX

CROSS REFERENCE TO RELATED APPLICATIONS

This application is a National Stage of International Application No. PCT/JP2020/019043, filed May 13, 2020, claiming priority to Japanese Patent Application No. 2019-103112, filed May 31, 2019.

TECHNICAL FIELD

The present invention relates to a method for producing purified chloroprene-based-polymer latex.

BACKGROUND ART

Since chloroprene-based-polymer latex undergoes a stripping step or the like in a production process, the chloroprene-based-polymer latex generally has a reduced concentration of residual volatile organic substances such as an unreacted monomer (a residual monomer) in polymerization reaction to 1% by mass or less.

However, awareness of influence of volatile organic substances on the environment or the human body is growing in recent years, and residual volatile organic substances in products of chloroprene-based-polymer latex is required to be further reduced therewith. Thus, purified chloroprene-based-polymer latex which includes a further reduced amount of such residual volatile organic substances is demanded.

For example, Patent Literature 1 describes a method for producing a polymer-dispersion by the emulsion or suspension polymerization of a monomer in an aqueous solution, the decompression of a polymerization batch, and the extraction and condensation of gaseous products. In the method, a dispersion optionally heated is sprayed in the form of liquid drops in the shape of a hollow circular cone or a disk having a diameter of at most 6 mm radiately toward the container wall in a container installed perpendicularly, separated therein, and collected at the bottom of the container, and at that time, gaseous substances are discharged from above the outlet for the dispersion from the spraying device.

CITATION LIST

Patent Literature

PTL1: JP 51-37175 A

SUMMARY OF INVENTION

Technical Problem

However, the Patent Literature 1 specifically discloses only a method for removing vinyl chloride in polyvinyl chloride latex, and does not disclose a method for removing residual volatile organic substances in chloroprene-based-polymer latex. In the Patent Literature 1, although the latex is radiately sprayed toward the container wall essentially, the degree of foaming by collision with the wall surface or aggregates produced by the local dryness of latex due to the heating of the container at this time is not noticed.

Meanwhile, when the present inventors have studied a method including forming chloroprene-based-polymer latex into liquid drops, introducing the liquid drops into the gas phase in the container, and volatilizing and removing the residual volatile organic substances in the chloroprene-based-polymer latex, they have found that the following problem is present.

First, chloroprene-based-polymer latex is very easily foamed. After chloroprene-based-polymer latex is formed into liquid drops and introduced into a container, foam may be formed on the inside wall of the container and/or the liquid surface. It can be considered that the greatest factor in the formation of foam is involving gas at the time of the contact between liquid and liquid.

The following has also been confirmed: when all the liquid drops of chloroprene-based-polymer latex are directly collided with the wall surface of the container, liquid flows on the wall surface after the liquid drops contact with the wall surface, and other liquid drops collide and contact therewith to result in formation of foam. It has been found that the foam reaches the latex liquid surface in the container and accumulates on the liquid surface, and when the amount of foam becomes excessive as compared with the container, the removal operation may therefore have to be interrupted. Moreover, it has been found that another problem with the method is that after the liquid drops collided with the wall surface in the container, the latex may be locally dried by the evaporation of moisture from liquid before the liquid flows down to the liquid surface to easily form aggregates.

The present invention has been made in such a situation, and an object of the present invention is to provide a method for producing purified chloroprene-based-polymer latex which enables efficiently removing a residual volatile organic substance from chloroprene-based-polymer latex while suppressing foaming and the deposition of aggregates.

Solution to Problem

The present inventors have found that the problem can be solved using a production method which satisfies specific conditions when a residual volatile organic substance in chloroprene-based-polymer latex is volatilized and removed. The present invention has been completed based on such findings.

Specifically, the present invention relates to the following [1] to [13].

[1] A method for producing purified chloroprene-based-polymer latex, comprising: at least the following steps (I) to (III):

Step (I): a step of introducing chloroprene-based-polymer latex into a container beforehand, Step (II): a step of removing a residual volatile organic substance in chloroprene-based-polymer latex which satisfies the following requirements (1) to (4):

Requirement (1): chloroprene-based-polymer latex is formed into liquid drops and introduced into a gas phase part in the container, Requirement (2): pressure in the container is less than atmospheric pressure, Requirement (3): the liquid drops are introduced so as to cover the whole liquid surface of the latex in the liquid phase part introduced into the container before the liquid drops, and Requirement (4): liquid temperature of the latex in the liquid phase part is less than a boiling point of water at the pressure in the container, and Step (III): a step of collecting the latex from the container after performing the step (II) at least once, to thereby obtain purified chloroprene-based-polymer latex.

[2] The method for producing purified chloroprene-based-polymer latex according to the [1], wherein the temperature of the latex in the liquid phase part previously introduced into the container in the requirement (3) is 10 to 55° C.

[3] The method for producing purified chloroprene-based-polymer latex according to the [1] or [2], wherein the latex is sprayed and introduced into the container in the requirement (1).

[4] The method for producing purified chloroprene-based-polymer latex according to the [3], wherein the latex is introduced from a spray nozzle in the requirement (1).

[5] The method for producing purified chloroprene-based-polymer latex according to any one of the [1] to [4], wherein the container is a cylindrical container, and one spray nozzle is at a center of a top surface inside the container.

[6] The method for producing purified chloroprene-based-polymer latex according to the [4] or [5], wherein the spray nozzle is a full conical nozzle.

[7] The method for producing purified chloroprene-based-polymer latex according to any one of the [1] to [6], wherein the temperature of the latex in the form of liquid drops to be introduced into the container in the requirement (1) is 10 to 55° C.

[8] The method for producing purified chloroprene-based-polymer latex according to any one of the [1] to [7], wherein the step (II) further satisfies the following requirement (5)':
Requirement (5)': a mixed fluid of water and one or more gases selected from the group consisting of inert gases and air is contacted with the latex in the liquid phase part in the container.

[9] The method for producing purified chloroprene-based-polymer latex according to the [8], wherein the mixed fluid is contacted with the latex in the liquid phase part by blowing the mixed fluid into the latex in the liquid phase part.

[10] The method for producing purified chloroprene-based-polymer latex according to any one of the [1] to [9], wherein the latex in the liquid phase part in the requirement (3) is circulated, and introduced into the container under a condition of the requirement (1).

[11] The method for producing purified chloroprene-based-polymer latex according to any one of the [1] to [10], wherein the residual volatile organic substance is an unreacted monomer in polymerization reaction in the production of the latex.

[12] A method for removing a residual volatile organic substance in chloroprene-based-polymer latex, wherein the residual volatile organic substance in chloroprene-based-polymer latex is volatilized to be removed, and the method satisfies the following requirements (1) to (4):

Requirement (1): chloroprene-based-polymer latex is formed into liquid drops and introduced into a gas phase part in a container, Requirement (2): pressure in the container is less than atmospheric pressure, Requirement (3): the liquid drops are introduced so as to cover the whole liquid surface of the latex in the liquid phase part introduced into the container before the liquid drops, and Requirement (4): liquid temperature of the latex in the liquid phase part is less than a boiling point of water at the pressure in the container.

[13] The method for removing a residual volatile organic substance in chloroprene-based-polymer latex according to the [12], wherein the method further satisfies the following requirement (5)':

Requirement (5)': a mixed fluid of water and one or more gases selected from the group consisting of inert gases and air is contacted with the latex in the liquid phase part in the container.

Advantageous Effects of Invention

According to the present invention, a method for producing purified chloroprene-based-polymer latex can be provided which enables efficiently removing a residual volatile organic substance from chloroprene-based-polymer latex while suppressing foaming and the deposition of aggregates.

BRIEF DESCRIPTION OF DRAWINGS

FIGS. 3-1 and 3-2 are simple explanatory drawings used for describing a requirement (3), shows one example of a device for removing volatile organic substances when a full conical nozzle is used, and is a sectional schematic view when the removing device is viewed from the front (FIG. 3-1) and a sectional schematic view when the removing device is viewed from the top (FIG. 3-2).

FIGS. 4-1 and 4-2 is simple explanatory drawings used for describing the requirement (3), shows one example of a device for removing volatile organic substances when a full conical nozzle is used, and is a sectional schematic view when the removing device is viewed from the front (FIG. 4-1) and a sectional schematic view when the removing device is viewed from the top (FIG. 4-2).

FIGS. 5-1 and 5-2 are simple explanatory drawings used for describing the requirement (3), shows one example of a device for removing volatile organic substances when a hollow conical nozzle is used, and is a sectional schematic view when the removing device is viewed from the front (FIG. 5-1) and a sectional schematic view when the removing device is viewed from the top (FIG. 5-2).

FIGS. 6-1 to 6-3 are simple explanatory drawings used for describing the requirement (3), shows one example of a device for removing volatile organic substances when multihole nozzle piping is used, and is a sectional schematic view when the removing device is viewed from the front (FIG. 6-1) and sectional schematic views when the removing device is viewed from the top (FIG. 6-2 and FIG. 6-3).

FIGS. 7-1 to 7-3 are simple explanatory drawings used for describing the requirement (3), shows one example of a device for removing volatile organic substances when a plurality of full conical nozzles is used, and is a sectional schematic view when the removing device is viewed from the front (FIG. 7-1) and sectional schematic views when the removing device is viewed from the top (FIG. 7-2 and FIG. 7-3).

DESCRIPTION OF EMBODIMENTS

Figure 1:
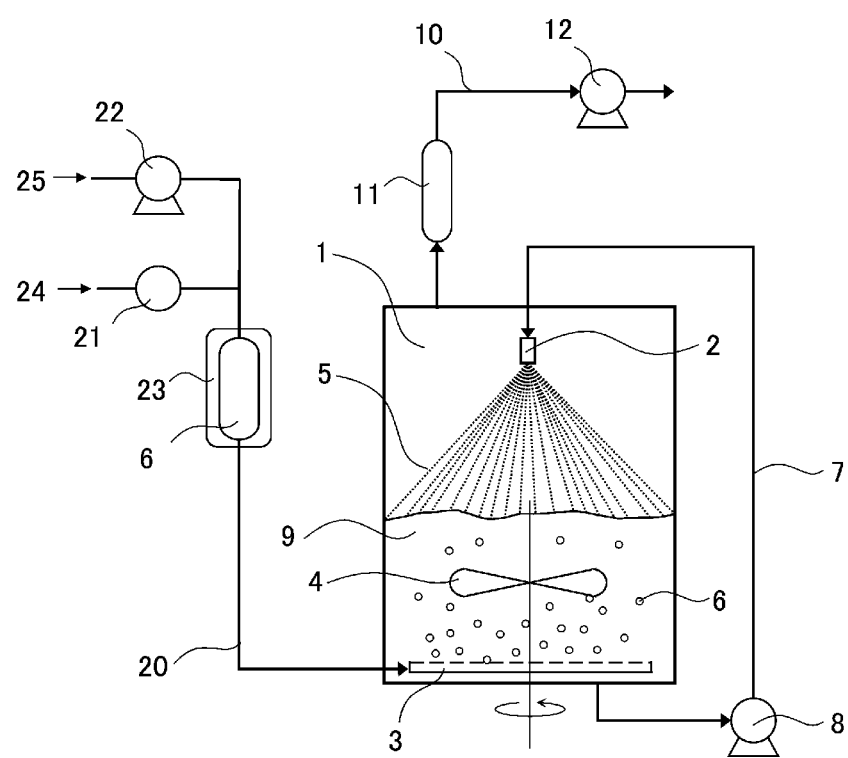
FIG. 1 is a schematic diagram showing a device for removing volatile organic substances used in the Examples.

Hereinafter, a method for producing purified chloroprene-based-polymer latex which is one aspect of the present invention will be described in detail.

In the present invention, the term "purified chloroprene-based-polymer latex" (hereinafter also referred to as merely "purified latex") means chloroprene-based-polymer latex produced through the step (I) to step (III) mentioned later.

In the present invention, merely "chloroprene-based-polymer latex" (hereinafter also referred to as merely "latex"), to which "purified" is not attached, means chloroprene-based-polymer latex not subjected to the step (I) to step (III) mentioned later or in the middle thereof.

As used herein, "removal" means removing at least a part of a residual volatile organic substance in chloroprene-based-polymer latex.

Herein, as to preferable numerical value ranges (for example, the ranges of the content), the lower limit values and the upper limit values described gradually can each independently be combined. For example, when there is a recitation "preferably 10 to 90, more preferably 30 to 80, and further preferably 40 to 70" as suitable ranges, the ranges of, for example, "10 to 70", "30 to 70", and "40 to 80" can also be selected from the recitation, which are each obtained by combining a lower limit value and an upper limit value each independently selected. Ranges which specifies merely either the lower limit values or the upper limit values, such as "40 or more" and "70 or less", can also be selected from the same recitation. For example, the same also applies to suitable ranges which can be selected from the recitation "preferably 10 or more, more preferably 30 or more, and further preferably 40 or more, and preferably 90 or less, more preferably 80 or less, and further preferably 70 or less".

Method for Producing Purified Chloroprene-Based-Polymer Latex

A method for producing purified chloroprene-based-polymer latex, which is one aspect of the present invention, has at least the following steps (I) to (III):

Step (I): a step of introducing chloroprene-based-polymer latex into a container as a liquid phase part beforehand, Step (II): a step of removing a residual volatile organic substance in chloroprene-based-polymer latex which satisfies the following requirements (1) to (4), and preferably, additionally satisfies a requirement (5), more preferably a requirement (5)':

Requirement (1): chloroprene-based-polymer latex is formed into liquid drops and introduced into a gas phase part in the container, Requirement (2): pressure in the container is less than atmospheric pressure, Requirement (3): the liquid drops are introduced so as to cover the whole liquid surface of the latex in the liquid phase part introduced into the container before the liquid drops, Requirement (4): liquid temperature of the latex in the liquid phase part is less than a boiling point of water at the pressure in the container, Requirement (5): one or more gases selected from the group consisting of inert gases and air are contacted with the latex in the liquid phase part in the container, and Requirement (5)': a mixed fluid of water and one or more gases selected from the group consisting of inert gases and air is contacted with the latex in the liquid phase part in the container, and Step (III): a step of collecting the latex from the container after performing the step (II) at least once, to thereby obtain purified chloroprene-based-polymer latex.

Chloroprene-Based-Polymer Latex

Chloroprene-based-polymer latex is an emulsion in which a chloroprene-based polymer is stably dispersed in water. As long as the stable dispersion state is maintained, the solid concentration of the latex is not particularly limited. The solid concentration is preferably 35 to 70% by mass, more preferably 37 to 65% by mass, and further preferably 40 to 62% by mass.

The solid concentration of the latex herein is a value measured by the method described in the Examples mentioned later.

The chloroprene-based polymer is a polymer using chloroprene (2-chloro-1,3-butadiene) as a monomer, and may be a homopolymer in which a monomer is only chloroprene, or may be a copolymer of chloroprene and another monomer.

Examples of the other monomer copolymerized with chloroprene include, but are not particularly limited to, 2,3-dichloro-1,3-butadiene, butadiene, isoprene, styrene, acrylonitrile, acrylic acid and esters thereof, and methacrylic acid and esters thereof. These may be used singly or in combination of two or more.

The monomers constituting the copolymer preferably contains chloroprene as the main component, and the content of chloroprene is preferably 70.0 to 99.9% by mass, more preferably 75.0 to 99.8% by mass, and further preferably 80.0 to 99.6% by mass in a total content of 100% by mass of all the monomers constituting the copolymer.

The method for producing the chloroprene-based-polymer latex introduced in the step (I) mentioned later is not particularly limited, and latex produced by a well-known method can be used as the latex introduced in the step (I) mentioned later. The latex can be produced, for example, by the method described in Production Example according to the Examples mentioned later.

Residual Volatile Organic Substance

Examples of the residual volatile organic substance contained in the latex include an unreacted monomer in polymerization reaction in the production of the latex (hereinafter also referred to as a "residual monomer") and an organic solvent used in the production process (hereinafter also referred to as a "residual organic solvent").

The residual monomer is an unreacted monomer among the monomers constituting the above-mentioned chloroprene-based polymer, and is mainly a chloroprene monomer, which is the main component of the chloroprene-based polymer. It is preferable that these residual monomers be removed in view of maintaining the quality, properties, and the like of the latex satisfactorily. Examples of the other residual monomer include 2,3-dichloro-1,3-butadiene, 1-chloro-1,3-butadiene, butadiene, isoprene, styrene, acrylonitrile, acrylic acid and esters thereof, and methacrylic acid and esters thereof, which are copolymer components. Among these, chloroprene is preferably used as the main component of the chloroprene-based polymer, as above mentioned, and the rate of chloroprene which remains as the residual monomer therefore tends to be high. Thus, it is preferable that chloroprene as much as possible be removed from the latex.

Examples of the residual organic solvent include linear aliphatic hydrocarbon solvents such as pentane, hexane, and heptane; alicyclic hydrocarbon solvents such as cyclopentane, cyclohexane, and methyl cyclohexane; alcoholic solvents such as methanol, ethanol, and isopropanol; aromatic hydrocarbon solvents such as toluene and xylene; ether solvents such as tetrahydrofuran, diethyl ether, and cyclopentyl methyl ether; ester solvents such as ethyl acetate, propyl acetate, and butyl acetate; and ketone solvents such as acetone, methyl ethyl ketone, and cyclopentanone.

The concentration of the residual volatile organic substance contained in the latex before the production method which is one aspect of the present invention is applied is preferably 150 to 10,000 ppm by mass, more preferably 175 to 5,000 ppm by mass, and further preferably 200 to 1,000 ppm by mass based on the total mass of the latex.

When the concentration of the residual volatile organic substance before the production method which is one aspect of the present invention is applied is 150 ppm by mass or more based on the total mass of the purified latex, the production method is advantageously applied to further reduce the concentration. If the concentration is 10,000 ppm by mass or less based on the total mass of the latex, the concentration can be further reduced efficiently by the method of the present invention.

The concentration of the residual volatile organic substance in the purified latex obtained after the production method which is one aspect of the present invention is implemented is preferably less than 200 ppm by mass, more preferably less than 150 ppm by mass, further preferably 100 ppm by mass or less, and more further preferably less than 50 ppm by mass based on the total mass of the latex.

Step (I)

The step (I) is a step of introducing chloroprene-based-polymer latex into a container as a liquid phase part beforehand. Here, "beforehand" refers to first introducing the latex into an empty container before the operation of the requirement (1) in the step (II) mentioned later is performed.

As long as the effect of the present invention is produced, the method for introducing the latex is not particularly limited. Examples include introducing the latex into the empty container from an introducing pipe or the like provided on the top surface, the side surface, or the bottom surface of the container.

Here, as for the shape of the latex at the time of introducing the latex into the container, the latex may be introduced so that the method of the requirement (1) mentioned later is satisfied; however, it is preferable that the latex be not introduced as liquid drops, but the liquid be poured as continuous fluid from the piping or the like in view of suppressing foaming at the time of initial introduction.

The amount of the latex introduced in the step (I) can be suitably adjusted to satisfy requirement (1) and the requirement (3) in the step (II) mentioned later, taking into consideration the shape of the container and the amount of the liquid drops introduced in the requirement (1) and also the flow rate of the latex discharged from the container and the like if needed.

As for the shape of the container, the inside space may be cylindrical or prismatic (preferably quadrangular prismatic), and is preferably cylindrical. A container is preferable in which the shape of the liquid surface of the latex in the requirement (3) mentioned later is a circle which is an ellipse or a perfect circle, or a quadrangle which is a rectangle or a square. A container in which the shape of the liquid surface is a circle is more preferable, and a container in which the shape is a perfect circle is further preferable. Examples of the container include a cylindrical container.

In one aspect of the present invention, it is preferable to use a device that has a cylindrical container as the container and has one spray nozzle mentioned later at the center of the top surface inside the container as the device for removing volatile organic substances, as shown in the Examples mentioned later.

It is preferable that the chloroprene-based polymer which the latex beforehand introduced into the container in the step (I) contain be the same as the chloroprene-based polymer which the latex introduced in the requirement (1) in the following step (II) contain, and it is more preferable that both be the same latex.

Step (II)

The step (II) is a step of removing the residual volatile organic substance in the chloroprene-based-polymer latex, and the step satisfies at least the following requirements (1) to (4). It is preferable that the step (II) further satisfy the following requirement (5)' in view of improving the efficiency in removing the residual volatile organic substance in the latex (hereinafter also referred to as merely "removal efficiency") and therefore achieving the downsizing of the container.

Requirement (1): The latex is formed into liquid drops and introduced into a gas phase part in the container.

Requirement (2): Pressure in the container is less than atmospheric pressure.

Requirement (3): The liquid drops are introduced so as to cover the whole liquid surface of the latex in the liquid phase part introduced into the container before the liquid drops.

Requirement (4): Temperature of the latex in the liquid phase part is less than a boiling point of water at the pressure in the container.

Requirement (5)': A mixed fluid of water and one or more gases selected from the group consisting of inert gases and air is contacted with the latex in the liquid phase part.

Hereinafter, the requirements (1) to (5)' will be described.

Requirement (1)

The step (II) satisfies the following requirement (1).
Requirement (1): The latex is formed into liquid drops and introduced into a gas phase part in the container.

An contact area between the gas phase part in the container and the latex surface per unit amount, the so-called gas-liquid interface area, increases by forming the latex into the liquid drops and then introducing the latex. Thus, the amount of the residual volatile organic substance volatilized from the latex increases, and the residual volatile organic substance can be removed more efficiently.

Here, the latex introduced in the step (II) may be the latex itself introduced in the step (I), and specifically, the latex beforehand introduced into the container in the step (I) may be fed by a circulation line or the like, returned to the container again, and introduced so that the initial step (II) is performed, or alternatively, latex provided in another container or the like separately from the latex introduced in the step (I) may be introduced. When the step (II) is performed by a circulation method a plurality of times or continuously, the latex circulated from the container and the latex beforehand provided in the other container may be introduced from separate routes, or both may be mixed and introduced. When the step (II) is performed by a circulation method continuously, it is preferable to perform the step (II) continuously such that the latex itself introduced in the step (I) is circulated to the container again.

As long as the method for forming the latex into liquid drops is a method which enables formation of liquid drops, the method is not particularly limited. Examples of the method include spraying the latex from a spray nozzle, ejecting or dripping the latex from a single hole nozzle or a shower nozzle, scattering liquid ejected from a nozzle with a collision plate or air, and hitting the latex against a dispersion plate at high speed.

As the gas-liquid interface area of the liquid drops increases, the removal efficiency is improved. The latex is therefore preferably introduced in a spray form. Among the methods for forming the latex into liquid drops, a method involving using a spray nozzle is more preferable in view of enabling the introduction of the latex in a spray form and easily reducing the liquid drop diameter.

As long as the effect of the present invention is produced, the type of the spray nozzle is not particularly limited, and for example, a full conical nozzle, a fan-shaped nozzle, or the like can be used. Among these, a full conical nozzle is preferable as the spray nozzle in view of easily satisfying the requirement (3) mentioned later. A full conical nozzle is a nozzle of a type which achieves formation of circular sprayed liquid drops and uniform flow rate distribution.

When the liquid drops are spherical, the diameter thereof is preferably 2.0 mm or less, more preferably 1.2 mm or less, and further preferably 1.0 mm or less; and preferably 0.1 mm or more, more preferably 0.2 mm or more, and further preferably 0.3 mm or more as the size of the liquid drops. When the diameter is 2.0 mm or less, the gas-liquid interface area increase to improve the removal efficiency, which is preferable. When the diameter of the liquid drops is 0.1 mm or more, the nozzle be hardly blocked, which is preferable.

As long as the effect of the present invention is produced, the method of forming the latex into liquid drops and introducing the latex into a container is not particularly limited. Examples of the method include a one-pass method and a circulation method, and the circulation method is preferable. The removal efficiency is favorably improved by extracting and circulating the liquid from the bottom of the container, forming the liquid into the liquid drops, and introducing the liquid into the same container again while the latex is formed into the liquid drops and introduced into the container.

As mentioned below in the following requirement (2), the pressure in the container is reduced to atmospheric pressure or less.

Requirement (2)

The step (II) also satisfies the following requirement (2).
Requirement (2): Pressure in the container is less than atmospheric pressure.

That is, the method of the present invention also satisfies a requirement that the pressure in the container into which the latex is formed into the liquid drops and introduced in the requirement (1) is less than atmospheric pressure.

When the pressure in the container is atmospheric pressure or more, the volatile organic substance is hardly volatilized from the liquid drops, and also, the removal efficiency decreases markedly in a case where the removal operation is desired to be performed in a temperature range in which the dehydrochlorination of the chloroprene-based polymer as mentioned later can be suppressed. When the pressure is a pressure of saturated water vapor pressure or less, water in the latex boils, and the latex is therefore locally dried to produce aggregates.

From such a viewpoint, the pressure in the container is preferably the saturated water vapor pressure of water+0.2 kPa or more, more preferably the saturated water vapor pressure of water+0.4 kPa or more, and further preferably the saturated water vapor pressure of water+0.5 kPa or more; and preferably the saturated water vapor pressure of water+10 kPa or less, more preferably the saturated water vapor pressure of water+5 kPa or less, and further preferably the saturated water vapor pressure of water+3 kPa or less. When the pressure is the saturated water vapor pressure of water+10 kPa or less, a decrease in removal efficiency can be suppressed to shorten time taken to perform the removal operation, which is preferable.

Requirement (3)

The step (II) also satisfies the following requirement (3).
Requirement (3): The liquid drops are introduced so as to cover the whole liquid surface of the latex in the liquid phase part introduced into the container before the liquid drops.

When the liquid drops introduced so that the requirement (1) is satisfied does not cover the whole liquid surface of the latex introduced into the container before the liquid drops, foam formed by the collision on the liquid surface escapes into areas where the liquid drops do not hit the liquid surface, and an increase in the amount of foam cannot therefore be suppressed.

Here, "the latex in the liquid phase part introduced into the container before the liquid drops introduced in the requirement (1)" refers to the latex introduced in the step (I) when the step (II) is performed only once or at the first time when the step (II) is performed twice or more in the circulation method. For example, if the circulation method is used, "the latex in the liquid phase part introduced into the container before the liquid drops introduced in the requirement (1)" in the second or subsequent step (II) refers to the latex introduced in the step (I) and/or the latex introduced into the container as the liquid drops in the first step (II). As mentioned above, in the production method which is one aspect of the present invention, the latex is fed and then introduced into the container again so that the requirement (1) is satisfied when the step (II) is continuously performed by the circulation method.

"The liquid drops cover the whole liquid surface" means a case where the area of a region closed by a closed line drawn by connecting liquid drops existing on the outermost edge among all the liquid drops which reach the liquid surface directly agrees with the area of the liquid surface. However, in the following case, it is determined that the liquid drops do not cover the whole liquid surface: foam formed at the time of the collision of the liquid drops with the liquid surface moves on line segments drawn by connecting the liquid drops existing on the outermost edge and the center of the above mentioned region, and the foam separates away by so long a distance that foam cannot be broken by the subsequent collision of liquid drops so that areas where the liquid drops do not reach exist; and in other words, so large regions where the liquid drops do not reach are produced that foam formed on the liquid surface by the collision of the liquid drops can move without breaking and accumulate in the above mentioned region. As an example of such a case, a case where a hollow conical nozzle wherein the ejection pattern of the liquid drops is hollow conical-shaped is used is supposed.

To form a state in which the liquid drops cover the whole liquid surface, for example, it is preferable to use a full conical nozzle wherein the ejection pattern of the liquid drops is full conical-shaped, and it is more preferable to use a full conical spray nozzle.

Hereinafter, the state in which "the liquid drops cover the whole liquid surface" will be visually described using FIGS. 3-1 and 3-2 to FIGS. 7-1 to 7-3.

Figure 2:
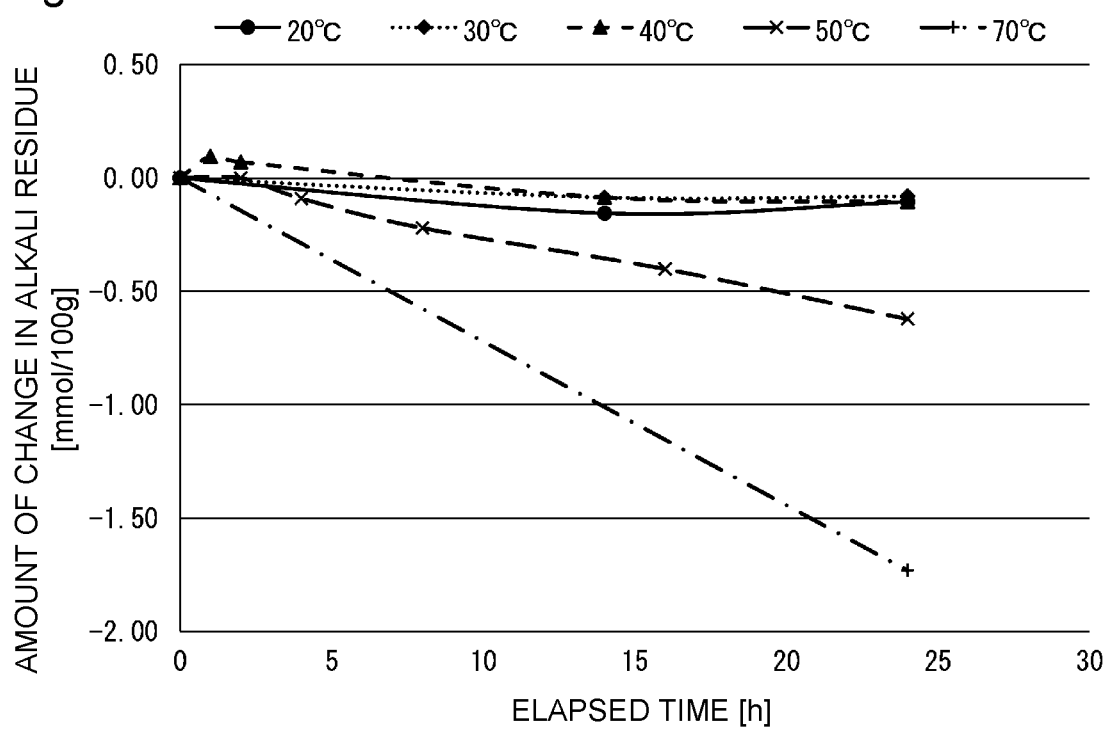
FIG. 2 is a graph which shows the results obtained by measuring the alkali residues in chloroprene-based-polymer latex after the latex was left to stand at specific temperatures for certain periods of time.
Figures 1, 3:
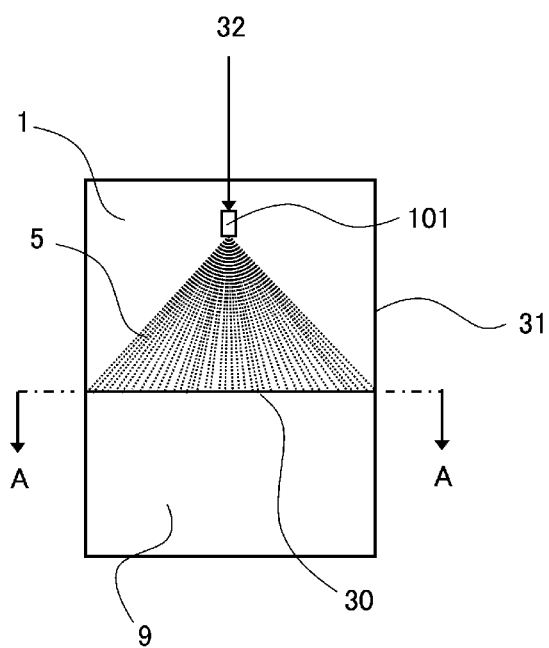
Figures 2, 3:
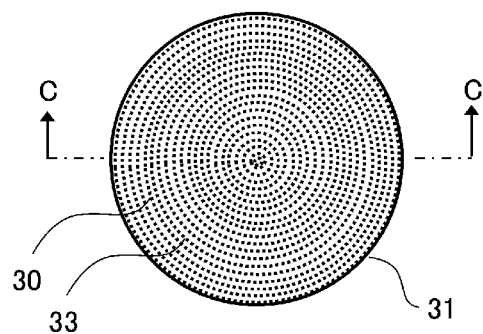

FIGS. 3-1 and 3-2 are simple explanatory drawings showing one example of the device for removing volatile organic substances when a full conical spray nozzle 101 is used, and is a sectional schematic view when the removing device is viewed from the front (FIG. 3-1) and a sectional schematic view when the removing device is viewed from the top (FIG. 3-2).

Here, the removing device shown in FIGS. 3-1 and 3-2 is a cylindrical container. FIG. 3-2 is a sectional schematic view at the A-A line in FIG. 3-1, and this corresponds to a schematic view when the liquid surface of the latex in the liquid phase part is viewed from the top. FIG. 3-1 is also a sectional schematic view at the C-C line in FIG. 3-2 (front view).

Here, the latex introduced from the full conical nozzle 101 in FIG. 3-1 is ejected in the shape of a cone as shown in FIG. 3-1, and the ejected liquid drops of the latex reach the liquid surface 30 of the latex in the liquid phase part as shown with positions 33 which liquid drops reach on the latex liquid surface of the liquid phase part in FIG. 3-2. In this case, it is found that the liquid drops of latex cover the whole of the liquid surface 30 of the latex in the liquid phase part. Such a state is said to be a state in which "the liquid drops cover the whole liquid surface". When the whole liquid surface is covered, some of the liquid drops near the perimeter of the base of the cone (the base when the shortest distance from the nozzle ejection port to the liquid surface is considered as the height of the cone) may collide with a container wall surface 31 as long as the effect of the present invention is produced.

Figures 1, 4:
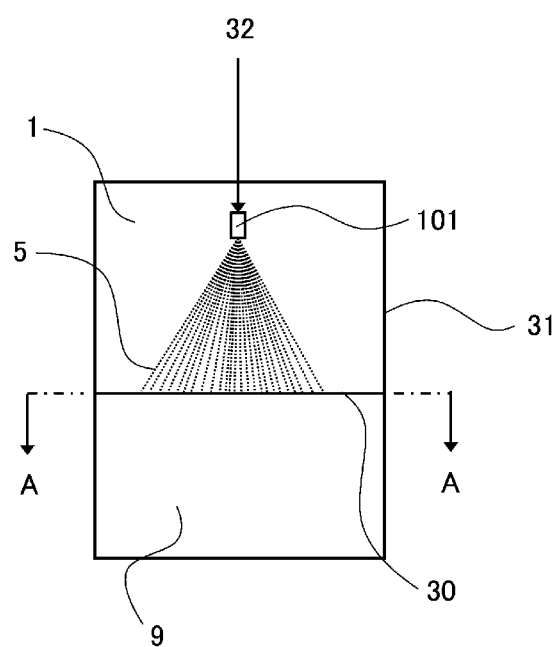
Figures 2, 4:
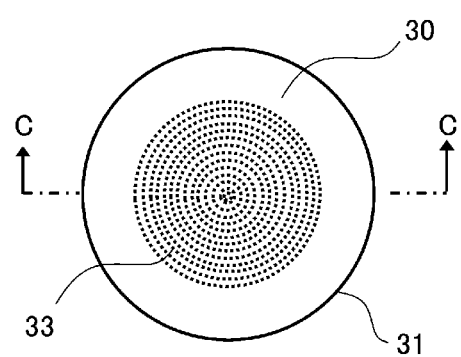

FIG. 4-1 and FIG. 4-2 are also simple explanatory drawings showing one example of the device for removing volatile organic substances when a full conical nozzle 101 is used in the same way as FIGS. 3-1 and 3-2. Here, the removing device shown in FIG. 4-1 amd 4-2 is a cylindrical container.

However, in the case of FIGS. 4-1 and 4-2, it is found that the perimeter of the base of the cone (the base when the shortest distance from the nozzle ejection port to the liquid surface is considered as the height of the cone) does not reach a container wall surface 31 as shown with positions 33 which liquid drops reach on a latex liquid surface 30 in the liquid phase part of FIG. 4-2. Such a state is not a state in which "the liquid drops cover the whole liquid surface."

Figures 1, 5:
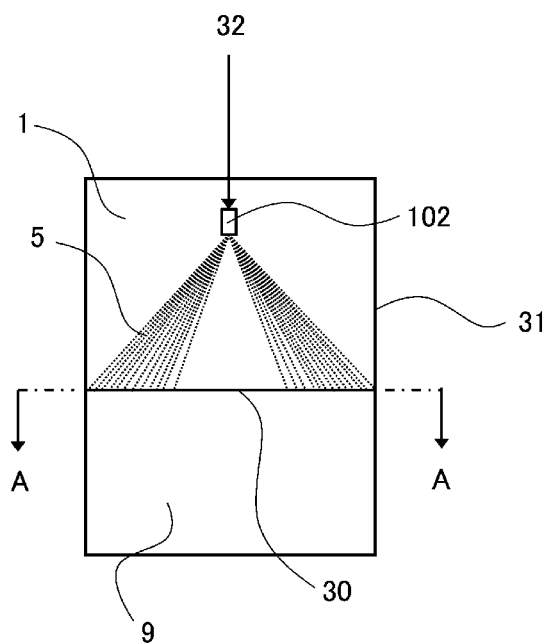
Figures 2, 5:
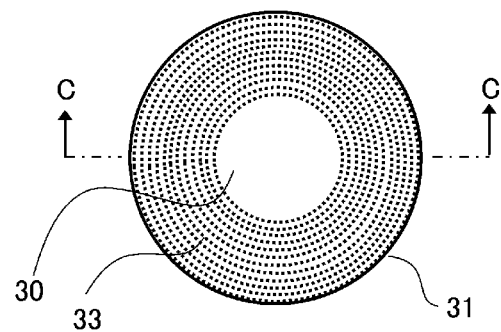

Next, FIG. 5-1 and FIG. 5-2 are simple explanatory drawings showing one example of the device for removing volatile organic substances when a hollow conical nozzle 102 is used. Here, the removing device shown in FIGS. 5-1 and 5-2 is a cylindrical container.

In the case of FIGS. 5-1 and 5-2, as shown by the positions 33 which liquid drops reach on a latex liquid surface 30 in the liquid phase part in FIG. 5-2, it is found that the perimeter of the base of the cone (the base when the shortest distance from the nozzle ejection port to the liquid surface is considered as the height of the cone) reach a container wall surface 31. However, it is found that a liquid surface which the liquid drops do not reach exists near the center of the liquid surface. Such a state is not a state in which "the liquid drops cover the whole liquid surface", either.

Figures 1, 6:
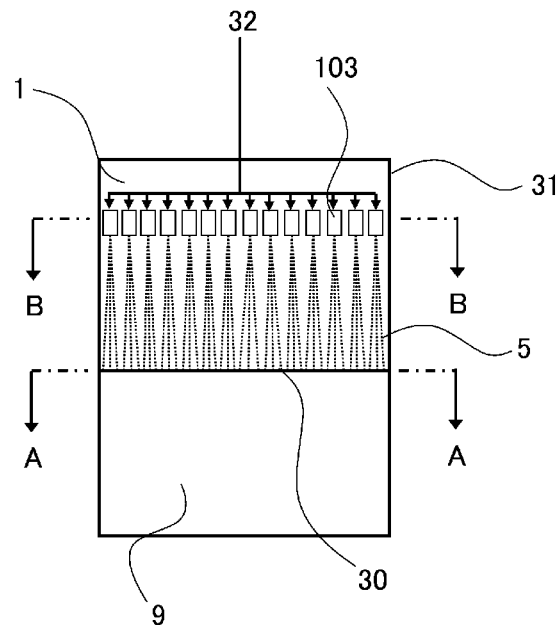
Figures 2, 6:
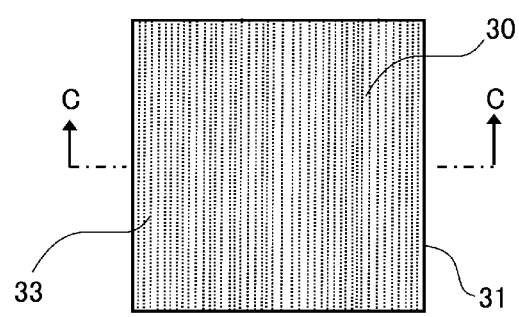
Figures 3, 6:
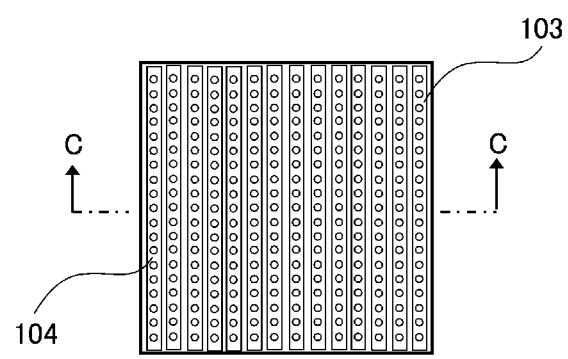

Next, FIG. 6-1 to FIG. 6-3 are simple explanatory drawings showing one example of the device for removing volatile organic substances when multihole nozzle piping 103 having a plurality of nozzle holes 104 is used. Here, the removing device shown in FIGS. 6-1 to 6-3 is a container in which the liquid surface 30 of the latex in a liquid phase part is a quadrangular shape, and is a cylindrical cuboid-shaped container.

In the case of FIGS. 6-1 to 6-3, as shown by positions 33 which liquid drops reach on a latex liquid surface 30 in a liquid phase part in FIG. 6-2, it is found that liquid drops reach the whole of the latex liquid surface 30 in the liquid phase part. Such a state can be said to be a state in which "the liquid drops cover the whole liquid surface."

Figures 1, 7:
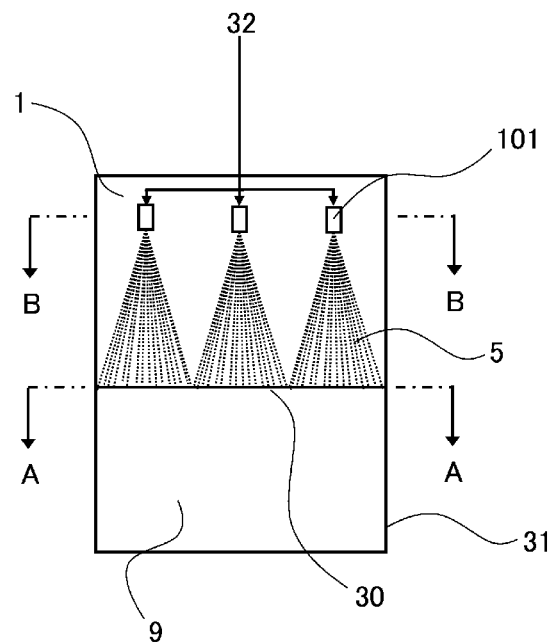
Figures 2, 7:
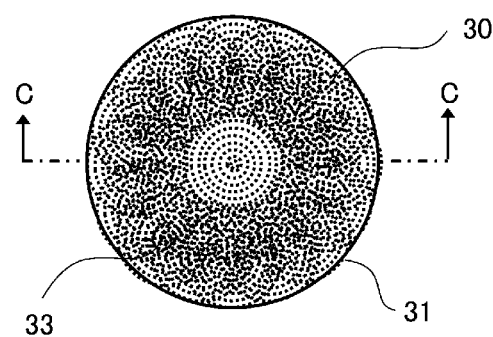
Figures 3, 7:
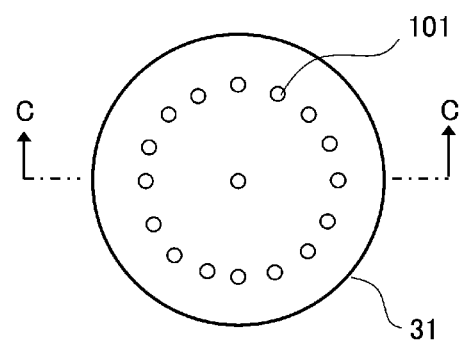

Next, FIG. 7-1 to FIG. 7-3 are simple explanatory drawings showing one example of the device for removing volatile organic substances when the removing device includes a plurality of full conical nozzles 101. Here, the removing device shown in FIGS. 7-1 to 7-3 is a cylindrical container.

In the case of FIGS. 7-1 to 7-3, as shown with positions 33 which liquid drops reach on a latex liquid surface 30 in a liquid phase part in FIG. 7-2, it is found that the liquid drops reach the whole of the latex liquid surface 30 in the liquid phase part. Such a state can be said to be a state in which "the liquid drops cover the whole liquid surface."

Time after the latex is formed into the liquid drops and introduced into the container until the liquid drops reach the liquid surface is preferably 0.10 seconds or more, more preferably 0.12 seconds or more, and further preferably 0.14 seconds or more. When the arrival time is 0.10 seconds or more, the volatile organic substance is easily removed until the liquid drops reach the liquid surface, to thereby improve the removal efficiency, which is preferable.

Requirement (4)

The step (II) also satisfies the following requirement (4).

Requirement (4): Temperature of the latex in the liquid phase part in the requirement (3) is less than a boiling point of water at the pressure in the container.

As mentioned above, when water in the latex boils, the latex is locally dried to produce aggregates, and foam in the container also increases markedly.

On the other hand, it is preferable that the temperature be not much lower than the boiling point in view of preventing too long time taken to perform the operation for removing the residual volatile organic substance.

From such viewpoint, the liquid temperature of the latex in the requirement (3) is less than the boiling point at pressure in the container, and the temperature difference between the boiling point of water at the pressure in the container and the liquid temperature of the latex in the requirement (3) is preferably 0.5 to 20.0° C., more preferably 1.0 to 10.0° C., and further preferably 1.2 to 5.0° C.

From the same viewpoints, the liquid temperature of the latex introduced into the container in the requirement (1) is preferably less than the boiling point at pressure in the container, and the temperature difference between the boiling point of water at the pressure in the container and the liquid temperature of the latex introduced in the requirement (1) is preferably 0.5 to 20.0° C., more preferably 1.0 to 10.0° C., and further preferably 1.2 to 5.0° C.

Chloroprene-based-polymer latex is very easily foamed. Accordingly, when the latex is formed into liquid drops and introduced into a container, the latex may be foamed though the foam formed at that time is not as much as that formed in a removing method by direct introduction of gas or boiling. It is considered that the greatest factor in the formation of foam is involving gas at the time of the contact between the liquid drops and the liquid surface. Therefore, it seems that the direct contact of the liquid drops with the liquid surface foams remarkably. It is however considered that when the requirement (3) is satisfied, foam formed by the contact of a liquid drop with the liquid surface is broken by collision with a liquid drop which comes flying subsequently, and foam is not, therefore, substantially formed.

Meanwhile, when liquid drops are directly collided with the wall surface of the container, other liquid drops contact with liquid which flows on the wall surface after the liquid drops contact with the wall surface, and foam is therefore formed. The formed foam reaches the latex liquid surface mentioned in the requirement (3), and is accumulated before all the formed foam is broken by contact with the other liquid drops. Accordingly, the amount of foam becomes excessive as compared with the capacity of the container, and the removal operation may have to be interrupted. Thus, it is not preferable that a rate at which liquid drops are directly hit against the wall surface increase. When the liquid drops are collided with the wall surface, moisture evaporates from liquid which flows down, and aggregates are therefore easily formed. The collision with the wall surface is not preferable especially when a container with a jacket is used. Therefore, also when the liquid drops cover the whole liquid surface of the latex, a rate at which the liquid drops collide with the wall surface of the container directly is desirably lower.

The same also applies to a case where liquid drops collide with a baffle or liquid drops collide with liquid drops introduced from other liquid drop inlets and reach the liquid surface to accumulate foam.

Temperature at Time of Removal Operation

It is preferable to set the temperature of the chloroprene-based-polymer latex to a somewhat high temperature in view of removing the residual volatile organic substance efficiently.

As mentioned above, as the temperature of the chloroprene-based-polymer latex is higher, chlorine atoms in the polymer are more easily eliminated as hydrogen chloride. Consequently, the dispersion state is easily unstabilized due to a decrease in the pH of the latex, and the modification and the quality deterioration occur easily due to a decrease in the crosslinking point. The amount of hydrogen chloride eliminated can be confirmed using as an index a change in the chlorine ion concentration, the pH, the concentration of the alkali residue (hydroxide ions), or the like in the latex.

It is considered that the degree of the progress of the elimination of hydrogen chloride almost depends only on the temperature.

Therefore, the temperature of the latex is preferably reduced in view of suppressing the elimination of hydrogen chloride from the polymer.

In the requirement (3), the temperature of the latex in the liquid phase part previously introduced into the container is therefore preferably 10 to 55° C., more preferably 20 to 50° C., further preferably 25 to 48° C., more further preferably 35 to 45° C. in view of removing the residual volatile organic substance efficiently while suppressing the elimination of hydrogen chloride from the polymer.

When the temperature is 10° C. or more, the removal efficiency can be improved to shorten time for removal, and the solidification of the latex can be prevented, which are preferable. When the temperature is 55° C. or less, the progress speed of dehydrochlorination can be slowed, and the volatile organic substance can be fully removed before the dehydrochlorination proceeds so much that the dehydrochlorination is unacceptable during the removal operation, which are preferable.

Even though the temperature is in this temperature range, the temperature must not exceed the boiling point of water at pressure at the time of the removal operation, as mentioned above in the requirement (4).

From the same viewpoints, the liquid temperature of the latex which is the liquid drops introduced into the gas phase part in the container in the requirement (1) is preferably 10 to 55° C., more preferably 20 to 50° C., further preferably 25 to 48° C., and more further preferably 35 to 45° C.

In a more suitable aspect of the step (II), the liquid temperature can be preferably adjusted in the following manner in view of suppressing the dehydrochlorination: the latex is warmed immediately before the latex is formed into the liquid drops and introduced into the container, and the latex itself after the introduction into the container is not warmed directly.

In one further suitable aspect of the step (II), the temperature of the liquid drop latex after the introduction into the container is preferably adjusted to more preferably 10° C. or more and 45° C. or less, further preferably 10° C. or more and 40° C. or less, more further preferably 10° C. or more and 30° C. or less, and more preferably 10° C. or more and 25° C. by warming the temperature of the latex to preferably 35 to 55° C., more preferably 35 to 50° C., further preferably 35 to 48° C., and more further preferably 35 to 45° C. immediately before the latex is formed into the liquid drops and introduced into the container in view of suppressing the solidification and the dehydrochlorination of the latex.

Requirement (5)

Treatment with Inert Gas or the Like

In the step (II), it is preferable to satisfy the following requirement (5), and it is more preferable to satisfy the requirement (5)', in view of removing the residual volatile organic substance efficiently.

Requirement (5): One or more gases selected from the group consisting of inert gases and air (hereinafter also referred to as "inert gas and/or air") are contacted with the latex in the liquid phase part in the container.

Requirement (5)': A mixed fluid of water and one or more gases selected from the group consisting of inert gases and air is contacted with the latex in the liquid phase part in the container.

The inert gas and/or air may be gas which hardly chemically reacts with the chloroprene-based-polymer latex, and is gas containing one or more selected from the group consisting of inert gases and air.

Examples of the inert gases include noble gases such as argon; and nitrogen gas. Nitrogen gas is preferable in view of economical efficiency such as availability and cost. Although the air may be the atmospheric air, the air preferably contains no acidic gas such as carbon dioxide because such air has lower reactivity with chloroprene-based-polymer latex, and the air is more preferably synthetic air obtained by mixing oxygen gas and nitrogen gas artificially.

The inert gas and/or air may contain an inert gas or air alone, may contain two or more of these, and preferably contains one or more selected from the group consisting of nitrogen gas and/or air in view of economical efficiency such as availability and cost.

Since the liquid drops can break foam in the above-mentioned removing method, the efficiency in removing the volatile organic substance can be enhanced by the combined use of the above-mentioned removing method with the removing method by directly introducing the inert gas and/or air, in which foam is easily formed, while foaming is suppressed. In the case of the removing method including introduction of the inert gas and/or air, an increase in the amount of the gas enables enhancing the removal efficiency, but the increase in the amount of the gas also increases the amount of foam. However, the treatment can be performed with a larger amount of the gas by obtaining a foam breaking effect in the combined use of the removing method, the above-mentioned removing method is suitable also as a method used together with the method including directly introducing the gas into the latex in the liquid phase part.

In this case, it is preferable to perform so-called bubbling, in which the inert gas and/or air or the mixed fluid is blown into the latex in the liquid phase part, in view of contacting the inert gas and/or air or the mixed fluid with the latex in the liquid phase part of the requirement (3) efficiently and uniformly. Examples of the method for the bubbling include blowing the inert gas and/or air or the mixed fluid into the latex of the liquid phase part using a sparger ring.

When the latex is formed into the liquid drops and introduced into the container in the requirement (1), the inert gas and/or air can also be introduced into the gas phase part in the container from the same viewpoint. In this case, the liquid drops are preferably subjected to counter current contact with the inert gas and/or air, whereby the removal efficiency is improved. When the inert gas and/or air is introduced into the gas phase part in the container, it is preferable to introduce the inert gas and/or air as the mixed fluid from the same viewpoint as of the description for the contact between the latex in the liquid phase part of the requirement (3) and the inert gas and/or air.

The device for performing the step (II) is not particularly limited. The device may be able to satisfy the above-mentioned requirements (1) to (4) and perform the operation for removing the residual volatile organic substance in the latex. A device which can also further perform the requirement (5) is preferable, and a device which can perform the requirement (5)' is more preferable. For example, the step (II) can be performed using the devices described in the Examples mentioned later.

Step (III)

The step (III) is a step of collecting the latex from the container to obtain purified chloroprene-based-polymer latex.

As long as the effect of the present invention is produced, the collecting method is not particularly limited. For example, the latex may be collected from a discharge pipe provided on the side surface or the bottom surface of the container or a discharge pipe provided in the circulation line, or the latex subjected to the step (II) in the container at least once may be poured into another container, and then collected from the container.

After the operation for removing the volatile organic substance in the step (II) is stopped, the top of the container may be then opened to collect the latex therefrom directly or collect through the above-mentioned discharge pipe or the like.

Method for Removing Residual Volatile Organic Substances in Chloroprene-Based-Polymer Latex A method for removing a residual volatile organic substance in chloroprene-based-polymer latex, which is one aspect of the present invention, satisfies the following requirements (1) to (4), and additionally satisfies preferably the requirement (5) and more preferably the requirement (5)'.

Requirement (1) Chloroprene-based-polymer latex is formed into liquid drops and introduced into a gas phase part in the container.

Requirement (2) Pressure in the container is less than atmospheric pressure.

Requirement (3) The liquid drops are introduced so as to cover the whole liquid surface of the latex in a liquid phase part introduced into the container before the liquid drops.

Requirement (4) Temperature of the latex in the liquid phase part is less than a boiling point of water at the pressure in the container.

Requirement (5) One or more gases selected from the group consisting of inert gases and air are contacted with the latex in the liquid phase part in the container.

Requirement (5)': A mixed fluid of water and one or more gases selected from the group consisting of inert gases and air is contacted with the latex in the liquid phase part in the container.

The requirements (1), (2), (3), (4), (5), and (5)' are identical with the requirements (1), (2), (3), (4), (5), and (5)' in the step (II) mentioned above in the section of Method for producing purified chloroprene-based-polymer latex, respectively, and the suitable aspects thereof are also the same. The description for these is therefore omitted here.

EXAMPLES

Hereinafter, the present invention will be described in detail by showing Examples and Comparative Examples. Unless departing from the gist of the present invention, the present invention is not limited to the following Examples.

As shown in the schematic diagram (schematic view) in FIG. 1, the device for removing volatile organic substances used in the Examples is a 1 $m^3$-cylindrical container 1 (inner diameter: 0.85 m and height: 1.76 m) having a jacket made of SUS304 (not shown) and including a vacuum line 10, a circulation line 7, a spray nozzle 2, a mixed fluid introduction line 20, a sparger ring 3, stirring blades 4 (a stirring shaft is installed from the central part of the bottom surface of the container to the vicinity of the center in the container and installed so that the stirring shaft is absent in a space from the vicinity of the center inside the container to the top surface in the container.), a thermocouple (not shown), and a pressure gauge (not shown) (hereinafter also referred to as "removing device container"). The spray nozzle 2 is installed in the central part of the top surface at a position which is 0.2 m below the top surface in the container 1 in the height direction.

The circulation line 7 includes an air driven diaphragm pump 8 for liquid feeding, a non-contact flow meter (not shown), and a thermocouple (not shown) in the course of the circulation line 7. The temperature (liquid temperature) of the latex was adjusted by circulating warm water to the jacket. The circulation flow rate was adjusted by the amount of air fed to the diaphragm pump 8. When the liquid temperature of the latex immediately before the latex was introduced into the removing device container 1 was measured using the thermocouple (not shown) installed on the circulation line 7 and immediately before the spray nozzle 2, the liquid temperature of the latex immediately before the latex was introduced into the removing device container 1 were the same temperature as the liquid temperature of the latex in the liquid phase in the removing device container 1 in all the Examples and Comparative examples shown below.

Any of "JJXP060S303", "JJXP12S303", "JJXP20S303", and "JJXP23S303" manufactured by H. IKEUCHI & Co., Ltd. (all were full conical nozzles) was used for the spray nozzle 2.

FIG. 1 schematically shows how liquid drops 5 sprayed from the spray nozzle 2 cover the whole surface of latex 9 in the liquid phase part introduced beforehand, for example, in the same way as in the operation in the Examples, for the sake of the description.

The pressure in the container 1 was adjusted with a vacuum pump 12 connected to an end of the vacuum line 10 and by the opening and closing degree of a ball valve (not shown) provided in the course of the vacuum line. A condenser 11 for water was installed in the course of the vacuum line 10.

As a mixed fluid 6 introduced in Example 4, a mixed fluid of nitrogen gas 24 and water was used. The flow rate of nitrogen gas 24 was adjusted with a mass flow controller 21. As water, pure water 25 was fed to a vaporizer 23 with a liquid-feeding pump 22 and heated with the vaporizer 23, and nitrogen gas 24 was introduced into the vaporizer 23 to prepare as the mixed fluid 6. The flow rate of water was adjusted by adjusting the amount of pure water 25 fed to the vaporizer 23.

FIG. 1 schematically shows how the mixed fluid 6 is introduced from the sparger ring 3 into the latex 9 in the liquid phase part, for example, in the same way as in the operation in the Example 4, for the sake of the description.

The analysis and evaluation methods in the present Examples and Comparative Examples are shown below.

Solid Concentration of Chloroprene-Based-Polymer Latex

Chloroprene-based-polymer latex was warmed at 140° C. for 25 minutes, dried, and the solid concentration of the chloroprene-based-polymer latex is then calculated by the following expression.

Solid concentration of latex (% by mass)=(latex mass after drying/latex mass before drying)×100

Confirmation of Requirement (3)

It was confirmed by visually observing the inside of the removing device container from the inspection window of the container whether or not liquid drop latex sprayed in the container covered the whole surface of latex in a liquid phase part introduced beforehand.

Concentration of a Volatile Organic Substance

It was considered that a chloroprene monomer which was a residual monomer contained after a polymerization reaction was a residual volatile organic substance. The measurement sample was prepared by the following method, and the concentration of the volatile organic substance was measured by high performance liquid chromatography under the measurement conditions shown below.

Preparation of Measurement Sample

First, 0.1 g of latex and 20 g of cyclohexane (produced by JUNSEI CHEMICAL CO., LTD.) were mixed to obtain a mixed solution. A mixed solution and an internal standard solution obtained by diluting butyl propionate with cyclohexane 100-fold (based on volume) were mixed at 9:1 (volume ratio) to prepare a measurement sample.

Measurement Conditions

System: High performance liquid chromatograph "Prominence (Registered trademark)" manufactured by SHIMADZU CORPORATION
Detector: UV 220 nm
Column: Product name "Asahipak (Registered trademark) ODP-50 4D" manufactured by SHOWA DENKO K.K.
Column temperature: 40° C.
Eluent: Acetonitrile/water=6/4 (volume ratio)
Flow velocity: 0.8 mL/min
Injection volume: 10 μL
Internal standard substance: Butyl propionate The concentration of a volatile organic substance was reduced by the removal operation according to the following expression. The concentration of the volatile organic substance when the removal operation is performed for arbitrary time can be estimated by finding the removal rate constant from the measurement results.

$$C(t) = C_0 \times \mathrm{EXP}(-kt)$$

C(t): Concentration of the volatile organic substance [ppm by mass] at a removal operation time t [h], $C_0$: Concentration of the volatile organic substance [ppm by mass] before removal operation, and k: Removal rate constant [$h^{-1}$].

Evaluation of the Amount of Dehydrochlorination (Measurement of Alkali Residue)

The amount of dehydrochlorination of chloroprene-based-polymer latex was evaluated by measuring the alkali residue (the amount of hydroxide ions, which was the residual amount of alkali components added in the latex) by the titration of 100 g of the latex with hydrochloric acid. When hydrogen chloride is generated, the alkali components is neutralized, and the alkali residue therefore decreases. As a surface active substance, 20 mL of "EMULGEN (Registered trademark) 709" (trade name, produced by Kao Corporation) was added to 100 g of latex, and ½ normal [N] hydrochloric acid (factor: f) was dropped using a burette until the pH was 10.5 (the first neutral point). The amount of dehydrochlorination was found as the alkali residue (unit: mmol/100 g) using the following expression from this dropping amount D [mL].

$$\text{Alkali residue} = f \times x \times 1/2$$

Evaluation of Whether Aggregates are Produced or Not

It was visually confirmed whether aggregates were present or not after the completion of the operation for removing a volatile organic substance.

Evaluation of Amount of Foam

The highest level of the foaming portion was read from the inspection window with which the container was equipped on a scale with which the container was equipped, and the liquid volume was deducted therefrom to find the amount of foam.

Production of Chloroprene-Based-Polymer Latex

PRODUCTION EXAMPLE

In a reactor with a capacity of 60 L, placed were 18.2 kg of 2-chloro-1,3-butadiene (chloroprene) (produced by Tokyo Chemical Industry Co., Ltd.) and 1.8 kg of 2,3-dichloro-1,3-butadiene (produced by Tokyo Chemical Industry Co., Ltd.) as monomers, 18 kg of pure water, 860 g of disproportionated rosin acid "R-300" (trade name, produced by ARAKAWA CHEMICAL INDUSTRIES, LTD.), 20.0 g of n-dodecyl mercaptan (produced by Tokyo Chemical Industry Co., Ltd.), 240 g of potassium hydroxide (produced by JUNSEI CHEMICAL CO., LTD.), and 160 g of a sodium salt of β-naphthalene sulfonic acid formalin condensate (produced by Kao Corporation).

After these materials placed were emulsified to prepare disproportionated rosin acid into rosin soap, potassium persulfate (produced by MITSUBISHI GAS CHEMICAL COMPANY, INC.) was added as an initiator and polymerization was conducted at 40° C. in a nitrogen atmosphere. When the polymerization conversion rate reached 88.1%, an emulsion of phenothiazine was added immediately to terminate the polymerization.

Subsequently, operation for removing the unreacted monomers was performed by steam distillation to obtain chloroprene-based-polymer latex (solid concentration: 59% by mass).

Example 1

In a removing device container, 200 L of chloroprene-based-polymer latex obtained in Production Example was placed. The latex was warmed to 40° C., and the pressure was reduced to 8.0 kPa (height of a liquid phase: 35 cm and height of a gas phase: 141 cm). The latex was sprayed in the removing device container through the spray nozzle JJXP23S303, to perform operation for removing a volatile organic substance. The circulation flow rate at this time was 14 L/min, the liquid temperature of latex immediately before spraying was 40° C., and the removal operation was continued for 5 hours. Liquid drops sprayed from the nozzle covered the whole surface of the latex in the liquid phase part introduced into the container. The concentrations of the volatile organic substance before the removal operation and after 1-hour and 5-hour operation were measured. The nozzle was installed such that the center of a jet orifice was the apex of a cone formed by the sprayed liquid drops and such that the base of the cone was a surface parallel to the liquid surface, and the liquid drops were sprayed from the nozzle at a spray angle of 60°.

Purified chloroprene-based-polymer latex subjected to the removal process was collected from a discharge pipe provided on the bottom surface of the removing device container after the above-mentioned operation time elapsed.

The following Table 1 shows the conditions for implementation and the evaluation results.

Example 2

In a removing device container, 300 L of chloroprene-based-polymer latex obtained in Production Example was placed. The latex was warmed to 40° C., and the pressure was reduced to 8.0 kPa. The latex was sprayed in the removing device container through the spray nozzle JJXP060S303, to perform operation for removing a volatile organic substance. The circulation flow rate at this time was 5 L/min, the liquid temperature of latex immediately before spraying was 40° C., and the removal operation was continued for 1 hour. Liquid drops sprayed from the nozzle covered the whole surface of the latex in the liquid phase part introduced into the container. The concentrations of the volatile organic substance before the removal operation and after 1-hour operation were measured. A nozzle was installed such that the center of a jet orifice was the apex of a cone formed by the sprayed liquid drops and such that the base of the cone was a surface parallel to the liquid surface, and the liquid drops were sprayed from the nozzle at a spray angle of 60°. The following Table 1 shows the conditions for implementation and the evaluation results.

Example 3

The removal operation was performed under the same conditions as in Example 1 except that the nozzle was changed into JJXP20S303, and that the spray angle was set as 70°. The liquid drops covered the whole liquid surface of the latex in the liquid phase part introduced into the container. The concentrations of the volatile organic substance before the removal operation and after 1-hour and 5-hour operation were measured. The following Table 1 shows the conditions for implementation and the evaluation results.

Example 4

The removal operation was performed under the same conditions as in Example 1 except that a mixed fluid at 40° C. of nitrogen at 1.2 L/min (standard conditions: 0° C., 101.3 kPa) and water at 14.4 L/min (standard conditions) was introduced through a sparger ring installed at the bottom of the removing device container, and that the removal operation was performed for 1.5 hours. That is, Example 4 satisfies the requirement (5)'. The liquid drops sprayed from the nozzle covered the whole liquid surface of the latex in the liquid phase part introduced into the container. The concentrations of the volatile organic substance before the removal operation and after 1.5-hour operation were measured. The following Table 1 shows the conditions for implementation and the evaluation results.

Comparative Example 1

The operation for removing a volatile organic substance was performed under the same conditions as in Example 2 except that the latex was not sprayed with the spray, and that the latex was not circulated. The concentrations of the volatile organic substance before the removal operation and after 1-hour operation were measured. The following Table 2 shows the conditions for implementation and the analysis results.

Comparative Example 2

The removal operation was performed under the same conditions as in Example 2 except that the temperature of the latex in the liquid phase part in the container and that the liquid temperature of the latex immediately before spraying were 43° C. Although the removal operation was performed for around 15 minutes, the circulation of the latex became impossible due to the clogging of the spray nozzle, and the removal operation was thus stopped at around 15 minutes after starting the operation. Foam was seen to be remarkably formed from the interface of the latex in the liquid phase part in a container under the operation, and aggregates were seen to attach to the stirring blades and the inside wall of the removing device container. The following Table 2 shows the conditions for implementation and the analysis results.

Comparative Example 3

The removal operation was performed under the same conditions as in Example 2, except the following: the pressure was reduced to 7.0 kPa, the nozzle was changed into JJXP12S303, the circulation flow rate was set as 10 L/min, and the spray angle was set as 70°. However, the removal operation was stopped after around 15 minutes due to remarkable foaming. Aggregates were seen to attach to the inside of the spray nozzle, the stirring blades, and the inside wall of the removing device container. The following Table 2 shows the conditions for implementation and the analysis results.

Comparative Example 4

The removal operation was performed under the same conditions as in Example 3 for 1 hour except that the circulation flow rate was set as 15 L/min, and that the nozzle was turned to the wall surface to eject latex so that all the latex collided with the wall surface. The concentrations of the volatile organic substance were measured before the removal operation and after 1-hour removal operation. Aggregates were produced on the wall surface with which the latex collided. The following Table 2 shows the conditions for implementation and the analysis results.

TABLE 1

| | | Example 1 | Example 2 | Example 3 | Example 4 |
|---|---|---|---|---|---|
| Liquid volume [L] | | 200 | 300 | 200 | 200 |
| Liquid temperature [° C.] (*1) | | 40.0 | 40.0 | 40.0 | 40.0 |
| Pressure in container [kPa] | | 8.0 | 8.0 | 8.0 | 8.0 |
| Boiling point of water [° C.] (*2) | | 41.5 | 41.5 | 41.5 | 41.5 |
| Nozzle type | | JJXP23 | JJXP060 | JJXP20 | JJXP23 |
| Sprayed or not | | Yes | Yes | Yes | Yes |
| Spray flow rate [L/min] | | 14 | 5 | 14 | 14 |
| Direction of spray ejection: liquid surface or wall surface | | Liquid surface | Liquid surface | Liquid surface | Liquid surface |
| Whether the whole liquid surface was covered or not | | Yes | Yes | Yes | Yes |
| Circulation | | Yes | Yes | Yes | Yes |
| Concentration of a volatile organic substance [ppm by mass] | Before removal operation | 218 | 244 | 284 | 257 |
| | After 1-hour operation | 152 | 200 | 215 | |
| | After 1.5-hour operation | | | | 139 |
| | After 5-hour operation | 36 | | 57 | |
| Removal rate constant [h$^{-1}$] | | 0.360 | 0.199 | 0.321 | 0.410 |
| Whether aggregates were produced or not | | No | No | No | No |
| Amount of foam [L] | | 0 | 100 | 0 | 20 |
| Remark | | | | | Bubbling (*3) |

*1 Liquid temperature of latex immediately before spraying.
*2 Boiling point of water under pressure condition of removal operation.
*3 A mixed fluid (1.2 L/min of nitrogen (standard conditions) and 14.4 L/min of water (standard conditions)) was used.

TABLE 2

| | | Comparative Example 1 | Comparative Example 2 | Comparative Example 3 | Comparative Example 4 |
|---|---|---|---|---|---|
| Liquid volume [L] | | 300 | 300 | 300 | 200 |
| Liquid temperature [° C.] (*1) | | 40.0 | 43.0 | 40.0 | 40.0 |
| Pressure in container [kPa] | | 8.0 | 8.0 | 7.0 | 8.0 |
| Boiling point of water [° C.] (*2) | | 41.5 | 41.5 | 39.0 | 41.5 |
| Nozzle type | | — | JJXP060 | JJXP12 | JJXP20 |
| Sprayed or not | | No | Yes | Yes | Yes |
| Spray flow rate [L/min] | | 0 | 5 | 10 | 15 |
| Direction of spray ejection: liquid surface or wall surface | | — | Liquid surface | Liquid surface | Wall surface |
| Whether the whole liquid surface was covered or not | | — | Yes | Yes | No |
| Circulation | | No | Yes | Yes | Yes |
| Concentration of a volatile organic substance [ppm by mass] | Before removal operation | 292 | — | — | 228 |
| | After 1-hour operation | 284 | — | — | 187 |
| | After 1.5-hour operation | 278 | — | — | — |
| | After 5-hour operation | — | — | — | — |
| Removal rate constant [h$^{-1}$] | | 0.032 | — | — | 0.198 |
| Whether aggregates were produced or not | | No | Yes | Yes | Yes |
| Amount of foam [L] | | 0 | >600 | >600 | 550 |
| Remark | | Blank | | *4 | |

*1 Liquid temperature of latex immediately before spraying.
*2 Boiling point of water under pressure condition of removal operation.
*4 Foam was formed remarkably, and continuation of the removal operation was impossible.

As shown in Table 1, it was confirmed that when the production methods of Examples 1 to 4 were used, the formation of foam and the production of aggregates in the removal process was suppressed, and that the concentrations of the volatile organic substance in purified latex were fully reduced.

As shown in Table 2, in the case of Comparative Example 1, in which the operation for forming latex into liquid drops and spraying the liquid drops in the gas phase part in the container was not performed, foam was not formed, but the volatile organic substance was hardly removed.

In the case of Comparative Example 2, in which the liquid temperature in the operation exceeded the boiling point of water at the operation pressure, foam was therefore formed so remarkably that continuation of the removal operation was impossible, and aggregates were produced.

In the case of Comparative Example 3, the liquid temperature in the operation exceeded the boiling point of water at the operation pressure. Accordingly, foam was formed so remarkably that continuation of the removal operation was impossible, and aggregates were produced.

In the case of Comparative Example 4, the liquid drops did not cover the whole surface, and moreover, all the liquid drops were ejected to the wall surface. Accordingly, foam increased, and aggregates were produced.

Evaluation of Progress of Dehydrochlorination

First, 100 g of the chloroprene-based-polymer latex was left to stand at 20° C., 30° C., 40° C., 50° C., or 70° C., and the alkali residues in the latex after certain periods of time were measured. FIG. 2 shows the results.

The following was confirmed from the results shown in FIG. 2: if the removal operation was performed for 24 hours or more at a liquid temperature of 30 to 40° C. or for around 4 hours a liquid temperature of 50° C., there was no significant difference between the change in the alkali residue in such removal operation and that in storage at 20° C. as room temperature; and even though the operation for removing the volatile organic substance was performed at 30 to 50° C., the volatile organic substance was therefore removed without changing the properties of chloroprene-based-polymer latex.

It was confirmed from these results that it is desirable to adjust the liquid temperature of the latex in the container after the spraying from the nozzle to preferably 55° C. or less, more preferably 50° C. or less, further preferably 45° C. or less, more further preferably 40° C. or less in view of suppressing the dehydrochlorination.

It is preferable that the liquid temperature be 10° C. or more in view of preventing the solidification of the chloroprene-based-polymer latex.

INDUSTRIAL APPLICABILITY

The use of a method for producing purified chloroprene-based-polymer latex of one embodiment of the present invention enables removing residual volatile organic substances efficiently while suppressing foaming and the deposition of aggregates from chloroprene-based-polymer latex. Thus, purified latex can be produced steadily without stopping the operation, and therefore, the production method which is excellent in safety and economical efficiency can be provided. Since the residual substances can be reduced efficiently, the production method can be used suitably also as a production method for producing purified latex which is highly excellent in quality stability.

REFERENCE SIGNS LIST

1: Container
2: Spray nozzle
3: Sparger ring
4: Stirring blades
5: Liquid drops sprayed from spray nozzle
6: Mixed fluid
7: Circulation line
8: Diaphragm pump
9: Latex in liquid phase part beforehand introduced into container
10: Vacuum line
11: Condenser
12: Vacuum pump
20: Mixed fluid introduction line
21: Mass flow controller
22: Liquid-feeding pump
23: Vaporizer
24: Nitrogen gas
25: Pure Water
30: Liquid surface of latex in liquid phase part
31: Wall surface of container
32: Latex introduced into container
33: Positions which liquid drops reach on latex liquid surface in liquid phase part
101: Full conical nozzle
102: Hollow conical nozzle
103: Multihole nozzle piping having a plurality of nozzle holes
104: Nozzle hole

The invention claimed is:

1. A method for producing purified chloroprene-based-polymer latex, comprising: at least the following steps (I) to (III):

Step (I): a step of introducing chloroprene-based-polymer latex into a container as a liquid phase part beforehand, Step (II): a step of removing a residual volatile organic substance in chloroprene-based-polymer latex which satisfies the following requirements (1) to (4):

Requirement (1): chloroprene-based-polymer latex is formed into liquid drops and introduced into a gas phase part in the container, Requirement (2): pressure in the container is less than atmospheric pressure, Requirement (3): the liquid drops are introduced so as to cover the whole liquid surface of the latex in the liquid phase part introduced into the container before the liquid drops, and Requirement (4): liquid temperature of the latex in the liquid phase part is less than a boiling point of water at the pressure in the container, and Step (III): a step of collecting the latex from the container after performing the step (II) at least once, to thereby obtain purified chloroprene-based-polymer latex;

wherein the step (II) further satisfies the following requirement (5)':

Requirement (5)': a mixed fluid of water and one or more gases selected from the group consisting of inert gases and air is introduced directly into the latex in the liquid phase part in the container.

2. The method for producing purified chloroprene-based-polymer latex according to claim 1, wherein the temperature of the latex in the liquid phase part previously introduced into the container in the requirement (3) is 10 to 55° C.

3. The method for producing purified chloroprene-based-polymer latex according to claim 1, wherein the latex is sprayed and introduced into the container in the requirement (1).

4. The method for producing purified chloroprene-based-polymer latex according to claim 3, wherein the latex is introduced from a spray nozzle into the container in the requirement (1).

5. The method for producing purified chloroprene-based-polymer latex according to claim 4, wherein the spray nozzle is a full conical nozzle.

6. The method for producing purified chloroprene-based-polymer latex according to claim 1, wherein the container is a cylindrical container, and one spray nozzle is at a center of a top surface inside the container.

7. The method for producing purified chloroprene-based-polymer latex according to claim 6, wherein the spray nozzle is a full conical nozzle.

8. The method for producing purified chloroprene-based-polymer latex according to claim 1, wherein the temperature of the latex in the form of liquid drops to be introduced into the container in the requirement (1) is 10 to 55° C.

9. The method for producing purified chloroprene-based-polymer latex according to claim 1, wherein the mixed fluid is introduced directly into the latex in the liquid phase part by blowing the mixed fluid into the latex in the liquid phase part.

10. The method for producing purified chloroprene-based-polymer latex according to claim 9, wherein the mixed fluid is a mixed fluid of water and one or more gases selected from inert gases.

11. The method for producing purified chloroprene-based-polymer latex according to claim 10, wherein the mixed fluid is a mixed fluid of water and one or more inert gases comprising nitrogen.

12. The method for producing purified chloroprene-based-polymer latex according to claim 1, wherein the latex in the liquid phase part of the requirement (3) is circulated, and introduced into the container under a condition of the requirement (1).

13. The method for producing purified chloroprene-based-polymer latex according to claim 1, wherein the residual volatile organic substance is an unreacted monomer in polymerization reaction in the production of the latex.

14. The method for producing purified chloroprene-based-polymer latex according to claim 1, wherein the mixed fluid is a mixed fluid of water and one or more gases selected from inert gases.

15. The method for producing purified chloroprene-based-polymer latex according to claim 14, wherein the mixed fluid is a mixed fluid of water and one or more inert gases comprising nitrogen.

* * * * *